(12) United States Patent
Weare

(10) Patent No.: US 7,333,985 B2
(45) Date of Patent: Feb. 19, 2008

(54) DYNAMIC CONTENT CLUSTERING

(75) Inventor: Christopher Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 10/735,999

(22) Filed: Dec. 15, 2003

(65) Prior Publication Data

US 2005/0131932 A1    Jun. 16, 2005

(51) Int. Cl.
*G06F 17/30* (2006.01)
*G06F 7/00* (2006.01)

(52) U.S. Cl. ............................. 707/6; 707/104.1; 707/3
(58) Field of Classification Search .................... 707/6, 707/104.1, 5, 3; 715/513
See application file for complete search history.

(56) References Cited

U.S. PATENT DOCUMENTS

| | | | |
|---|---|---|---|
| 6,012,053 A | | 1/2000 | Pant et al. |
| 6,029,195 A | * | 2/2000 | Herz ........................... 725/116 |
| 6,041,323 A | * | 3/2000 | Kubota ........................... 707/5 |
| 6,526,440 B1 | | 2/2003 | Bharat |
| 6,529,903 B2 | | 3/2003 | Smith et al. |
| 6,615,209 B1 | | 9/2003 | Gomes et al. |
| 6,658,423 B1 | | 12/2003 | Pugh et al. |
| 6,678,681 B1 | | 1/2004 | Brin |
| 7,249,124 B2 | * | 7/2007 | Sasaki et al. .................... 707/3 |
| 2001/0019628 A1 | * | 9/2001 | Fujimoto et al. ............ 382/225 |
| 2002/0069218 A1 | * | 6/2002 | Sull et al. ................. 707/501.1 |
| 2002/0123988 A1 | | 9/2002 | Dean et al. |
| 2002/0133481 A1 | | 9/2002 | Smith et al. |
| 2002/0152051 A1 | * | 10/2002 | Fukushige et al. ........... 702/179 |
| 2003/0050927 A1 | * | 3/2003 | Hussam ........................... 707/5 |
| 2003/0061200 A1 | * | 3/2003 | Hubert et al. .................... 707/3 |
| 2003/0182310 A1 | * | 9/2003 | Charnock et al. ......... 707/104.1 |
| 2005/0022114 A1 | * | 1/2005 | Shanahan et al. ............ 715/513 |
| 2005/0149473 A1 | | 7/2005 | Weare |

OTHER PUBLICATIONS

C. Watters and Hong Wang. "Rating News Documents for Similarity" *Journal of the American Society for Information Science*, pp. 793-804. Jul. 2000.

A. Kurtz and J. Mostafa. "Topic Detection and Interest Tracking in a Dynamic Online News Source" *JCDL* '03 May 1-2, 2003, Houston, Texas. . . pp. 122-124.

S.H. Lin and J.M. Ho. "Discovering Informative Content Blocks form Web Documents" *SIGKDD* '02 Jul. 23-26, 2002, Edmonton, Alberta, Canada. pp. 588-593.

J. Hu, J. Zhong and A. Bagga. "Combined-Media Video Tracking for Summarization" *MM* '01, Sep. 30-Oct. 5, 2001, Ottawa, Canada. pp. 502-505.

S. Brin and L. Page. *The Anatomy of a Large-Scale Hypertextual Web Search Engine*. Aug. 7, 2000. http://www7.scu.edu.au/programme/fullpapers/1921/com1921.htm.

(Continued)

*Primary Examiner*—Kuen S Lu

(57) ABSTRACT

A method and a system for dynamically updating information for publication on the Internet. Meaningful content is extracted from information received from multiple sources such as news sources. The information can contain text, sound, images and video. A set of characterizing features for the received information is determined. Information having common characterizing features is grouped together into a number of clusters. The information obtained in the grouping step is used to determine how to publish the information contained in a cluster based on a customer request for information. This customer request can be based on a query or a customer profile assigned to the customer.

23 Claims, 3 Drawing Sheets

OTHER PUBLICATIONS

Jianying Hu et al. "Combined-Media Video Tracking for Summarization", International Multimedia Conference; vol. 9, Proceedings of the ninth ACM international conference on Multimedia, 2001, pp. 502-505.

European Patent Office "European Search Report" for application No.: 04027921.8, Date of completion of the search Sep. 17, 2007, Munich.

Shewhart M. et al. "Monitoring a newsfeed for hot topics", Proceedings of the International Conference on knowledge discovery and data mining, 1999, pp. 402-404.

Lang K. "NewsWeeder: learning to Filter Netnews", Proceedings of the International Conference on Machine Learning, Jul. 9, 1995, pp. 331-339.

Buckley C. "The Importance of Proper Weighting Methods", Proceedings of the Workshop on Human Language Technology, 1993, pp. 349-352.

Baeza-Yates R. et al. "Modern Information Retrieval, Chapter 2: Modeling", Modern Information Retrieval, Harlow: Addison-Wesley, GB, 1999.

Jain A.K. et al. "Data Clustering: a review", ACM Computing Surveys, ACM, New York, NY, US, 1999, vol. 31, No. 3, pp. 264-323.

Forman G. "Choose Your words Carefully: An Empirical Study of Feature Selection Metrics for Text Classification", European Conference on Principles of Data Mining and Knowledge Discovery. PKDD, Aug. 19, 2002, pp. 150-162.

European Patent Office "Partial European Search Report" for European Patent Application No. 04 027 921.8, Place of Search Munich, Date of completion of search Mar. 23, 2007.

Salton G. et al. "Generation and search of clustered files", Internet Citation, [Online], Dec. 1978.

Leouski A. and Croft W. "An Evaluation of Techniques for Clustering Search Results", Technical Report IR-76, Department of Computer Science, University of Massachusets, [Online], 1996, pp. 1-19.

Lee D. L. and Chuang H. and Seamons K. "Document ranking and the vector-space model", Software, IEEE, [Online], vol. 14, No. 2, Mar. 1997, pp. 67-75.

* cited by examiner

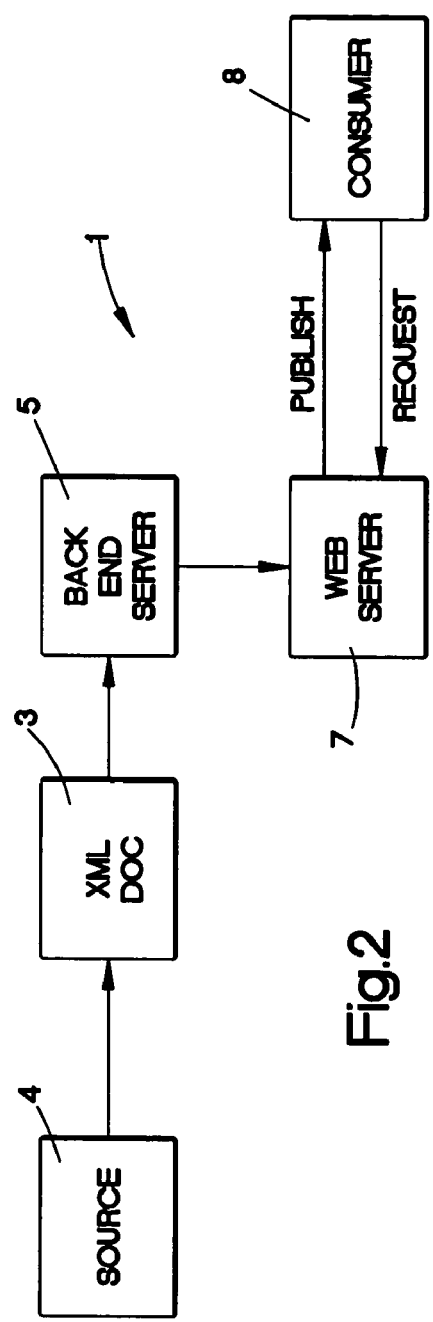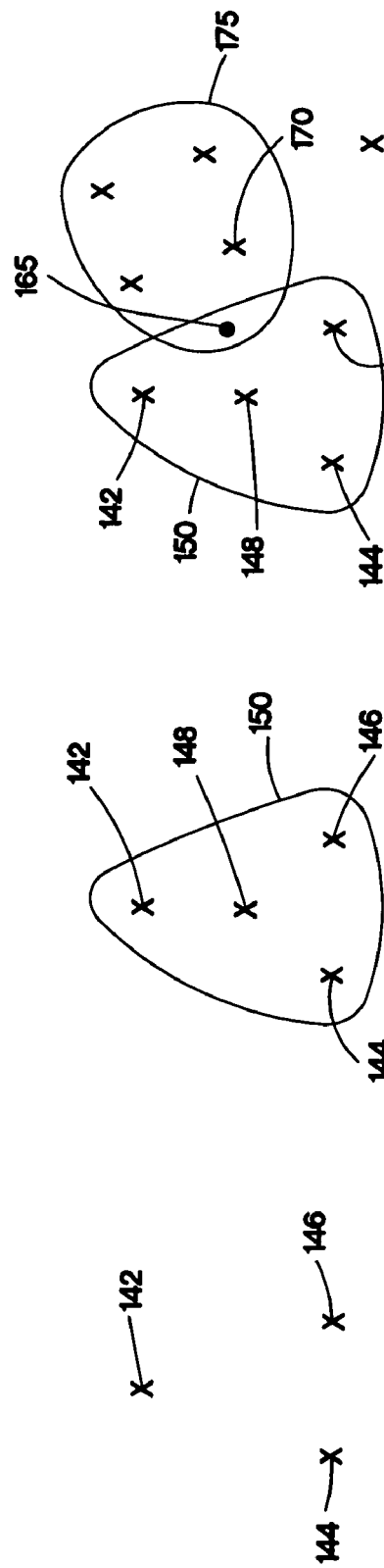

DYNAMIC CONTENT CLUSTERING

FIELD OF THE INVENTION

The present invention concerns document analysis for automatic categorizing and republication of the document.

BACKGROUND ART

Users who wish to find relevant and up-to-date information from sources of data such as the Internet face a continuous deluge of new content. By grouping like content together, the task of sorting through this large amount of data can be simplified.

Existing technology has been used to automatically separate the content of a web based original document. An article to Lin et al. entitled "Discovering Informative Content Blocks from Web Documents" describes a process of automatically removing redundant data from meaningful content from web text. The goal of this article is to separate meaningful data from redundant, repetitive and usually un-interesting data appearing on web pages.

Once the redundant data has been stripped from the page, the text content of the web page can be classified using known indexing techniques. The indexed web pages can then be evaluated by existing web search engines such as the GOGGLE, MSN or YAHOO search engines. The Lin et al article discards as irrelevant portions of the web pages deemed to have redundant data, but does not change the indexing or evaluation of text pages found to have meaningful information.

A publication to Watters et al. entitled "Rating News Documents for Similarity" concerns a personalized delivery system for news documents. This publication discusses a methodology of associating news documents based on the extraction of feature phrases, where feature phrases identify dates, locations, people, and organizations. A news representation is created from these feature phrases to define news objects that can then be compared and ranked to find related news items.

In the context of the larger search problem, the current invention provides a means whereby users can quickly browse through a large collection of information and spot those items that are of interest to them by presenting only the content that is conceptually distinct.

SUMMARY OF THE INVENTION

A method and a system are disclosed for dynamically updating information for publication. Meaningful content is extracted from information received from multiple sources. The information can contain text, sound, images and video. A set of characterizing features for the received information is determined. Information having common characterizing features is grouped together into a number of clusters. The information obtained in the grouping step is used to determine how to publish the information contained in a cluster based on a customer request for information. This customer request can be based on a query or a customer profile assigned to the customer.

One use of the invention is for use with a Newsbot automated news portal which uses dynamic content clustering to continually identify and modify collections of news stories that are being presented at web-based news sites around the globe. As articles come into the Newsbot system they are assigned to pre-existing clusters if they center on previously covered stories, otherwise they are assigned to new clusters. Every few minutes the state of the clusters within the Newsbot system is recorded to a catalog file which is then used to build the various Newsbot web pages.

These and other objects, advantages and features will become better understood from the accompanying exemplary embodiment which is described in conjunction with the accompanying drawings.

BRIEF DESCRIPTION OF THE DRAWINGS

FIG. 2 is a schematic representation of an internet based document retrieval system for presenting data to a requester;

FIGS. 6A and 6B are schematic depictions of document data clusters associated together to form a neighborhood of such data clusters; and FIG. 7 is a schematic depiction of overlapping neighborhoods of clusters.

EXEMPLARY SYSTEM FOR PRACTICING THE INVENTION

Figure 1:
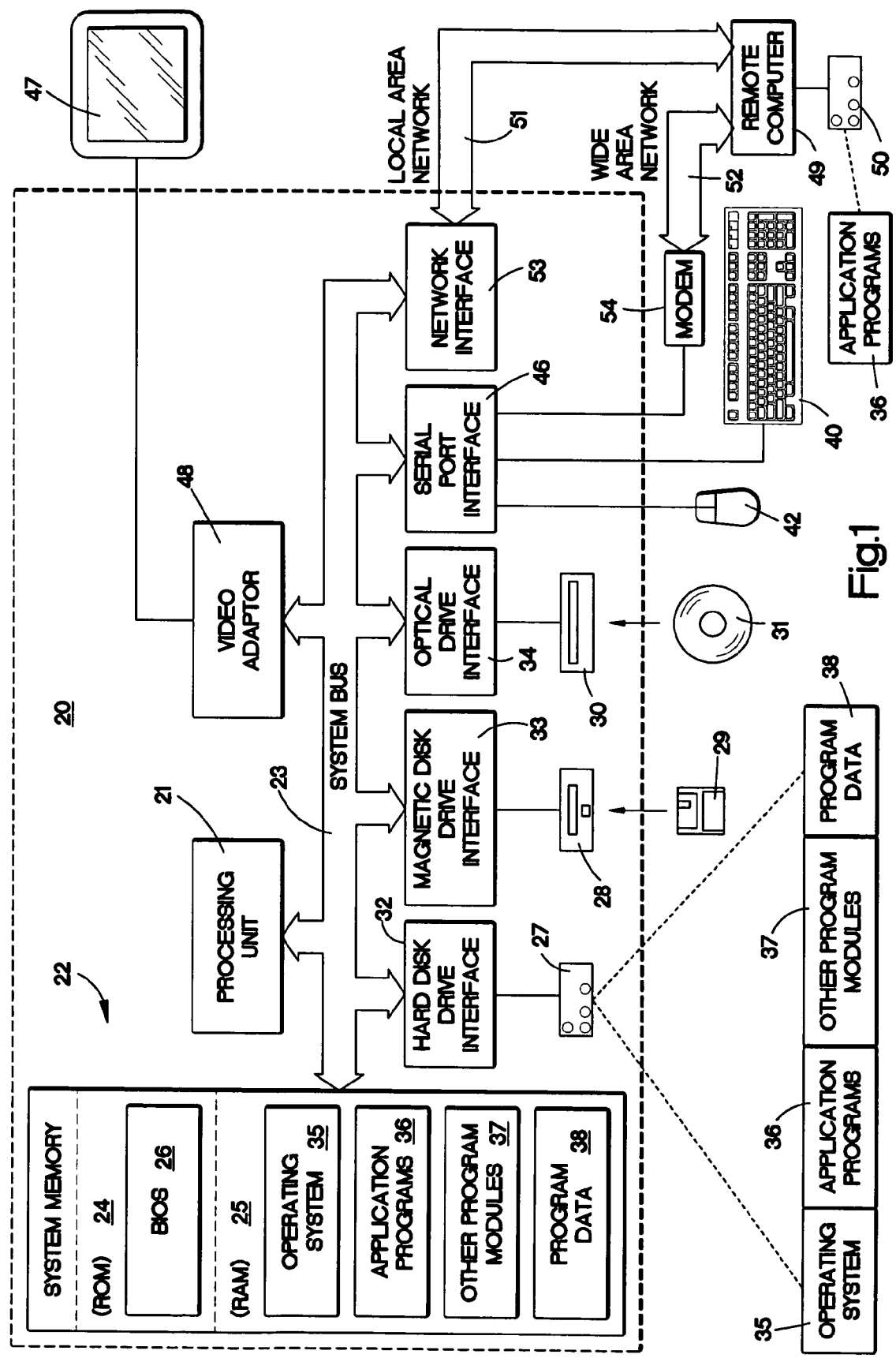
FIG. 1 is a representative computer system used in implementing components of an exemplary embodiment of the present invention.

FIG. 2 depicts a representative system 1 for evaluating documents and returning results based on a request for information from a user. The system includes a preprocessor that is implemented on a back end server 5 having data storage for receiving a document 3 from one of a plurality of document sources 4. The back end server 5 evaluates the document for subsequent publication. FIG. 1 depicts the architecture of a representative computer that could be used to implement the back end server. Although the invention is not limited to evaluation of text documents, in one exemplary embodiment, the received document contains text in an 'XML' format. News documents, for example, are prepared by the ASSOCIATED PRESS, REUTERS, the NEW YORK TIMES or CNN news sources (representative sources 4) and made available to the system 1 on a periodic basis as new breaks around the world.

The exemplary preprocessor is part of a back end server computer 5 executing an operating system, such as Windows Server software and including storage for a large number of documents that are evaluated and classified. Text data contained in each received XML document is evaluated or classified. A database of documents that are received is maintained in a web server 7. Classification of the database of documents is updated so that an incoming request for documents (from a user for example) can be responded to with up to the date information by publication of the documents deemed most suitable based on criteria discussed below. The evaluation or classification is accomplished by the back end server 5 by grouping together documents having a commonality into a number of clusters of documents referred to as a catalog of those documents.

The FIG. 2 web server 7 makes use of an updated catalog of cluster data from the back end server 5. The web server 7 makes available, to a user or consumer 8, documents contained within a cluster as judged by the web server as being most relevant. The judging of relevance is based on a number of criteria, some of which may include information made available to the web server from a particular consumer.

Computer System

FIG. 1 depicts an exemplary data processing system. A data processing system such as the system shown in FIG. 1 can act as both the back end server 5 and the web server 7. The system includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 5:
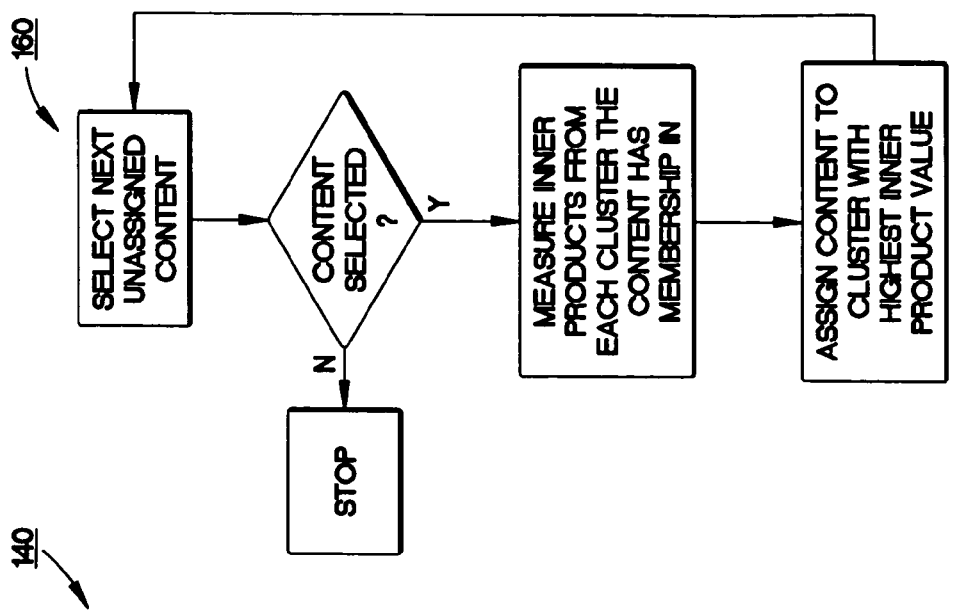
FIGS. 3-5 are flowcharts of document processing steps performed during classification of those documents for efficient access to a requester.
Figure 4:
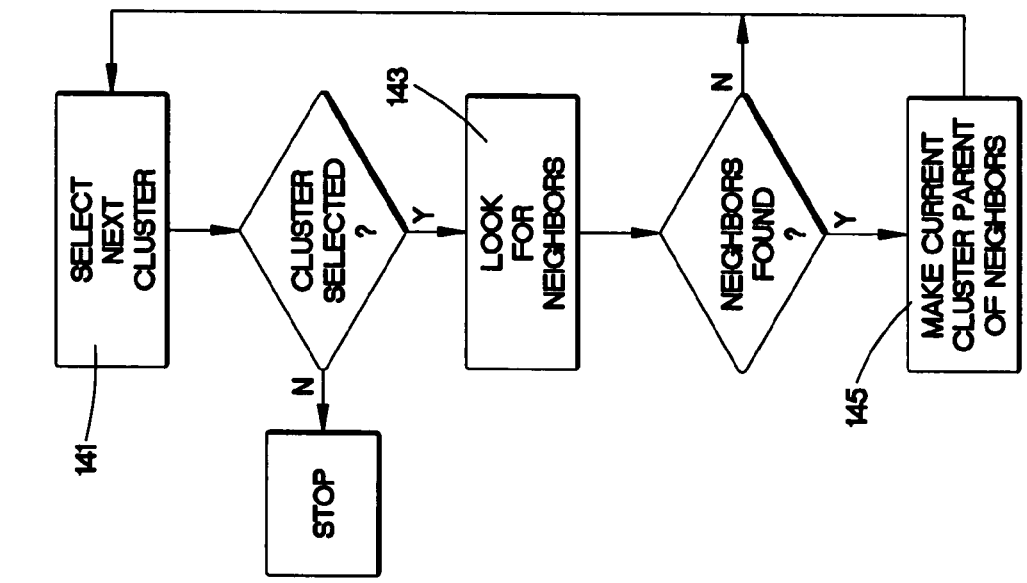
Figure 3:
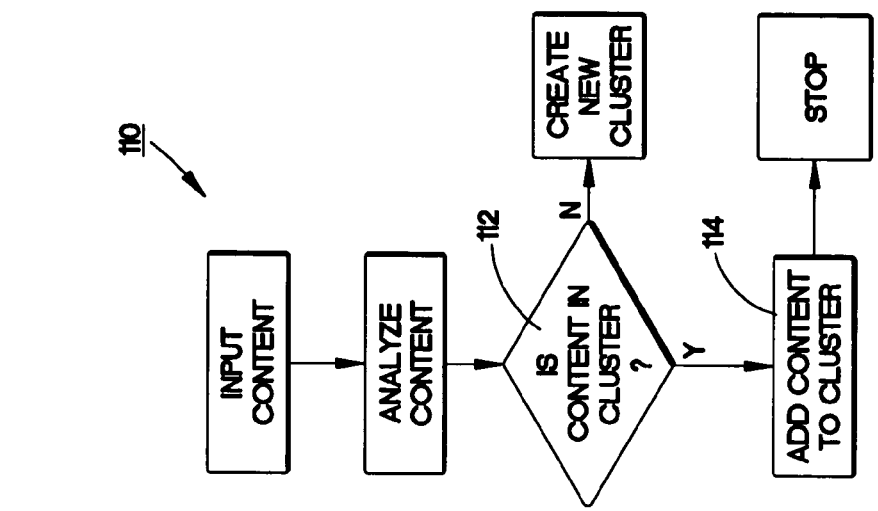

FIGS. 3-5 depict the process performed on incoming information by the back end server 5. The process is divided into three phases: an input phase 110, a coalesce phase 140, and an assignment phase 160. During the input phase 110, data having content enters the system. During the coalesce phase, an exemplary system groups common data together by clustering the data and stores it in a database. During an assignment phase, the system makes an assignment of content to a cluster neighborhood. This assignment is also maintained in a database of records that describe the cluster or clusters and neighborhood of the incoming content.

The responsibilities of the three phases of the present invention are carried out by two major components: an analysis component, and a clustering component. The analysis component is responsible for reducing the data contained in a piece of content to a relevance-sorted list of the top N most important tokens present in the content. The analysis occurs during the input phase 110. The content can be text, video, audio, etc. The specific technique used for the reduction depends on the type of content. The clustering component is responsible for assigning content to clusters and for grouping similar clusters together.

Input Phase 110

Consider an analysis component for textual content. One application of such an analysis is for use in conjunction with a news analysis domain for providing a user with a list of relevant news articles. The analysis component works at a word-token level.

A token is considered to be one or more words that represent a single concept. For instance, 'Ball', 'Explosion', and 'Space Shuttle' all reference single concepts. The text within a given article is reduced to a relevance sorted array of tokens in the following manner:

Where and how often each token appears in the text is noted.

If the token appears in the title then T occurrences are added to the word count of that token and the starting position of that token is set to zero.

The relevance of token i is set to $\exp(-a*p_{0i})*N_i*R_i$, where a is the decay rate of token relevance as a function of the distance from the beginning of the text, $p_{0i}$ is the position at which token i first appears in the text, $N_i$ is the number of occurrences of token i within the given article and $R_i$ is the log of the inverse document frequency of token I where the frequency is measured as the number of times the word appears one or more times in a document divided by the number of document contained in a representative corpus. Typically, a collection of recent articles is used as the representative corpus.

The top K token-relevance pairs for each piece of content are sent to a clustering engine. The sum of the relevancies is normalized to 1.0 (L1 norm).

Consider the following short news story:

Shuttle Disintegrates on Re-Entry

At 12:08 this afternoon, NASA announced that the space shuttle Discovery disintegrated as it was re-entering the earth's atmosphere. Witnesses in a remote area of Texas saw remnants of what was believed to be the doomed shuttle disintegrate in long white plumes that extended across the blue sky. Discovery's mission had been plagued with difficulties for the entire two weeks it had been in space. Just yesterday, Commander Smith of Discovery was quoted by communications specialists at NASA's mission control as saying "this has been a tough ride and on behalf of my crew I want to thank you guys for all the help you have given us." Smith along with the seven other mission specialists are presumed dead and NASA has confirmed that it has contacted the families of all eight crew members. In the post 9/11 sensitivity to terrorist activity, NASA made it clear there was no evidence of tampering or attacks on the space craft. President Bush has already scheduled a news conference tomorrow evening (Wednesday 8:00 PM EST) and it is speculated that by the time of the new conference NASA may have more information regarding the cause of this disaster.

Consider the word 'Shuttle' in this story. In the exemplary system, the case of the letter in a word is deemed unimportant so that Shuttle and shuttle are equivalent. Note, from above the term Shuttle appearing in the title adds a frequency occurrence in addition to the normal frequency occurrences found in the body of the text. Assume T=2. In this new story the term shuttle appears six times (four actual and two due to its presence in the title). Additionally, the first position of 'shuttle' is set to zero since it appears in the title, causing the term $\exp(-a*p_{0i})$ to equal one.

As the document is received, it has already been classified as a 'news' document by its source. Other classifications are 'sports', 'entertainment', 'travel' etc or subcategories of those classifications. The preprocessor software executing on the back end server maintains a database for news category documents. The database has document frequency data for thousands of words contained in currently cataloged news documents. For recently breaking new stores the frequency of certain words may start low and increase over time. For a recently received news story the occurrence of Shuttle in all cataloged news documents is low so that the inverse log function is high. Based on these factors it is fairly certain that one of the K highest relevance tokens in this story is the word "shuttle".

For a given news article, the results of this analysis is a vector of (token, relevance) pairs having a size K, where K is the number of such pairs in the vector. A Vector of the form $\vec{X} = (W_i, X_i)$ is formed. Each token or word W in the top K in terms of relevancy contributes to the vector and the value X for a token is determined by the above relevance formula. The value of the vector is normalized so that the value of the relevance factors $X_i$ of the N terms or tokens sums to 1.0. Based on a cursory inspection, other tokens that appear in the top N terms are 'NASA', 'space' and 'Discovery'.

The clustering component of the preprocessor employs a modified 'fuzzy kmeans' clustering technique. K means clustering is a well known process for grouping together data based on the similarity of the data. K means clustering is described, for example, in U.S. Pat. No. 6,012,058 to Fayyad et al which issued in January 2000. The disclosure of this patent is incorporated herein by reference.

Clustering is an important area of application for a variety of fields including data mining, statistical data analysis, and data compression. Many popular clustering techniques use a basic K-means approach wherein data clusters are initialized and data is added to the initialized clusters in a hard manner i.e., each data item belongs to one and only one cluster. In accordance with the exemplary embodiment, an information content item or document can belong to more than one cluster.

In accordance with an exemplary embodiment, each cluster is represented by the following pieces of information:

The content items (text documents for example) assigned to the cluster of a form for publication by the web server.

The top K token-relevance pairs (normalized so the sum of the relevance facts is 1.0) that represent that cluster. These set of pairs are referred to as the cluster mean.

The top L required tokens for that cluster. In order for a piece of content, such as a text document, to be added to this cluster, the content must contain within its top K token-relevance pairs all of the L required tokens. L is a number less than K and may for example be a fixed predetermined value common for all clusters. In one exemplary embodiment the value for L is set to a value that depends on language and category of document. A value of three (3) has been used with success on a system for categorizing news documents.

When a document is first received from a source 4, the document is evaluated and assigned to an existing cluster. If it cannot be assigned to a cluster, it forms its own cluster containing one document. When the token-relevance pairs for a given piece of content enter the clustering component, the process 110 shown in FIG. 3 is followed:

Retrieve all candidate clusters to which the present piece of content might belong, i.e., all clusters whose L required tokens are present in the current piece of content.

Calculate the inner product of token-relevance pairs between the piece of content and candidate clusters. The inner product is also known as the dot product of two vectors. This calculation allows the back end server to make a determination 112 of whether the content is added to a cluster.

The content is added 114 to each cluster where the inner product mentioned above exceeds a given threshold T. The determination to add occurs in one exemplary system if the inner product exceeds an empirically determined value. This value is determined based on how tightly a category of documents should be focused while maintaining a reasonable number of documents in the group or cluster and can be a dynamically varying value.

When a piece of content is added to a cluster, the cluster mean is recalculated by taking the sum of all token-relevance pairs from all content assigned to that cluster; selecting the top K token-relevance pairs; normalizing the sum of the result to 1.0. The tokens from the top L token-relevance pairs become the cluster's required tokens.

If no clusters match the input content then a new cluster is created for that content. The mean of the single document cluster is the K token-relevance pairs. The tokens from the top L token-relevance pairs become the cluster's required tokens.

Coalesce Phase 140

At periodic intervals (Every few minutes in a news gathering embodiment of the invention), during what is called the Publication Cycle, the clusters are checked (FIG. 4) to see if previously separate clusters should be grouped together into a neighborhood. This process occurs during the 'coalesce phase' 140. The same process that is used to find clusters for input content is used during this phase, i.e. the inner product of cluster means is determined. However, what happens when a match is found is different.

When two or more clusters are coalesced, the means (normalized token/relevance pairs) of the clusters are not changed. However, the cluster which causes the coalescing is selected to be a parent cluster. This 'cluster of clusters' is called a neighborhood. A neighborhood can contain one or more clusters.

If cluster B is coalesced into cluster A, i.e., cluster B now has cluster A as its parent, then all the clusters which had cluster B as their parent now have cluster A as their parent and belong to the same neighborhood as A.

When the cluster membership changes, i.e., a new cluster is added to the neighborhood, or an older neighborhood expires, the content (the text documents for example) that was previously assigned to that neighborhood is assigned to the null neighborhood (when content first enters the clustering system it is also assigned to the null neighborhood). In the above example, when cluster B is coalesced into A, all content of B and A is assigned to the null neighborhood. Similarly, if the neighborhood expires due to the passage of time, the content of all clusters from that neighborhood is assigned to the null neighborhood. Expiration of a neighborhood means its relevancy has fallen below a threshold as described below.

Consider the three clusters 142, 144, 146 depicted in FIG. 6A. These three clusters contain documents having similar content. However, the three documents are not similar enough as measured by the inner product of their means to be called a neighborhood. Stated another way, the inner product of the clusters does not exceed a threshold established to group the clusters together. This threshold is typically the same as the threshold established for categorizing a document within a cluster. Now assume a cluster 148 is created and documents are added to that cluster that are similar to each other. During execution of the flowchart of FIG. 4, the cluster 148 is selected 141 and the process examines 143 neighbors 142, 144, 146 (as well as more distant clusters, note clusters are viewed as distant when their inner products are small) and determines the four clusters 142, 144, 146, 148 are similar enough to warrant creation of a neighborhood 150 (FIG. 6B). As seen in the flowchart of FIG. 4, the cluster 148 whose evaluation caused the neighborhood to be set up is chosen the parent of the neighborhood 150.

Assignment Phase 160

Although content was assigned to multiple clusters during the input stage, the content (documents) are not yet assigned to a neighborhood.

During each publication cycle an assignment phase 160 is entered. The assignment phase determines which neighborhood a piece of content should belong to. Recall that during the input phase a piece of content can be assigned to multiple clusters. Consider the situation of FIG. 7. A document 165 is assigned to the cluster 148 and a second cluster 170 of a second neighborhood 175. Thus, it is sometimes the case that during the coalesce phase 140, the clusters to which the content or document was assigned belong to separate neighborhoods, such as the neighborhoods 150, 175. During publication to a user it is therefore necessary to select which neighborhood the content belongs.

During the assignment phase 160 all content assigned to the null neighborhood is selected. For each piece of content, the inner product between each cluster the article is assigned to and the article is calculated. The neighborhood to which the cluster with the highest article-cluster inner product belongs to is the neighborhood to which the article is assigned (see FIG. 5). Recall that there are two types of clusters, one type is a low level cluster, to which an article may belong. In fact the article may belong to several of these low level clusters. The second type is the neighborhood which is a cluster of clusters. An article may belong to only one neighborhood. Membership in a neighborhood is set to null when the article is brought into the system or when a neighborhood expires or when a neighborhood is split or combined. This way, the system knows which content needs to be reassigned, i.e. when the articles that previously belonged to one of the neighborhoods that changed needs to be reassigned. The system uses the above process to see to which cluster the article belongs to determine to which neighborhood the article should be reassigned. In the case of an expired neighborhood, reassignment is a necessity. In the case of an altered neighborhood the change to the neighborhood may cause an article in one neighborhood to be reassigned.

A user or consumer 8 is desirous of getting information in the form of a neighborhood of documents from the web server 7. In a typical instances these neighborhood of documents are presented on a web browser such as Internet Explorer (IE) or one of a number of other browsers suitable for document presentation on a computer networked by means of either a company intranet or wide area network such as the Internet. In FIG. 2 the interchange of information between the web server 7 and the consumer 8 is by means of a request. The server responds to this request by publishing a number of documents contained in a most relevant neighborhood.

A consumer 8 may provide the server 7 with particularized information concerning the specific consumer. If, for example, the consumer is logged onto his or her computer with its .Net passport. The information available from the consumer 8 includes the consumer's past browser behavior. More specifically, the information provided is the past behavior in the form of mouse 'clicks' on various links relating to different category of documents. Thus, if the consumer is a sports fan, the category of documents may all relate to 'baseball'. If the consumer is an investor, the category of documents may predominately be in a 'stock news' related category. If the user is not logged onto his or her computer in a way that the web server can identify specific past behavior, the consumer request is treated in a generic way and is assigned the past behavior of all such generic users.

Other information may automatically be made available to the web server 7. The source of the request may be encoded as part of the consumer's unique internet address.

If so the particular language and country of the consumer may be part of the information supplied with the request. It is also possible that the request may include a specific query. Thus, the request may include a direct indication that the consumer is interested in all articles relating to recent space shuttle events. This request would presumably cause the web server to publish back to the user the sample news article quoted above. Based on the information available to the web server 7, the server 7 responds to a request by publishing a neighborhood judged most relevant to the request. This relevancy factor is maintained by the web server for each neighborhood of documents.

Relevancy of a neighborhood changes with time. Old news is of little interest to one searching for information concerning current events. Older in time documents may be extremely relevant, however, to one having an interest in history or a chronology of events relating to an event, place or person. To determine the relevancy number or factor of a neighborhood, one must initially take into account the relevancy of an article or document.

The Relevance of an Article, Ar, is Given as:

$$Ar=(A \cdot N)*\exp(-t1_a)*ICB_a*PR_a,$$

A is a vector representing the keywords of article A with each element in the vector corresponding to a word and the magnitude of the element corresponding to the word relevance.

N is the vector representing the parent neighborhood of the article. This vector is based upon the means of all documents that make up the neighborhood. The inner product between A and N (written as A·N) is the similarity measure between A and N.

$1_a$ is the decay rate of articles as a function of time, which is given by t.

$ICB_a$ is a factor that rewards articles that are being presented to users from representative markets. For instance, if an article is being published to a user or consumer 8 in the United Kingdom and the publisher or source 4 of the article is also from the United Kingdom then the $ICB_a$ will be set to a large value, i.e., 10.0, otherwise, $ICB_a$ will typically take a value of 1.0.

$PR_a$ is a factor that rewards articles from valued sources. The value represents the value of the publisher. For instance, articles from the BBC typically have a click-through rate that is 2 times higher than the average click through rate for a randomly selected publisher. There for, $PR_a$ for articles from the BBC will have a $PR_a$ of 2.0.

The relevance of an article is used in the calculation presented below used to determine the relevancy of a neighborhood of documents.

Certain articles that enter the system are never published because they lack focus. These might be documents that concern a variety of topics. The focus of an article is given by the relevance value of the most relevant key word in the article. If this value is too low it indicates that the assumption that the article is centered around a single topic is likely false. Therefore, that article is not considered for neighborhood inclusion. Currently, a value of 0.1 is used. A value near 0.05 would indicate that no focus exists at all as by necessity, all other keyword relevancies are also 0.05 and therefore the article has no focus.

Also, after 2 days an article that has not been assigned to a neighborhood due to its lack of focus is abandoned. It will never be published.

The Relevance of a Neighborhood, Nr, is Given as:

$$Nr=sum(Ar)*e(-t1_n)*Sr_n$$

The sum of Ar over all articles which have the neighborhood N as their parent.

$1_n$ is the decay rate of neighborhoods as a function of time, which is given by t.

$Sr_n$ is a factor that weights neighborhoods from different categories of documents. For instance, Sports stories might have a rating of 1.0 while World news could have a rating of 10.0. The $Sr_n$ factor can be a default for a neighborhood or could be assigned based upon an interest of a particular user or consumer determined based upon past behavior of that particular consumer.

Once a neighborhood's relevance falls below a threshold value as time passes for example or depending on a user request received by the web server, the neighbor no longer passes the test of relevancy and is not returned in response to a request.

While the invention has been described with a degree of particularity, it is the intent that the invention include all modifications and alterations falling within the spirit or scope of the appended claims.

What is claimed:

1. A method for dynamically updating a collection of information in a database including a plurality of pre-existing clusters of information for publication comprising:
   a) extracting from received information a set of characterizing features which characterize the received information,
   wherein said received information comprises multiple features of a given type and
   wherein the multiple features are ranked in importance as the features are extracted;
   b) updating the collection of information by grouping the received information with one or more pre-existing clusters in the collection that have characterizing features in common with the received information and grouping together a plurality of pre-existing clusters having common characteristics to produce a neighborhood of clusters,
   wherein each of the one or more pre-existing clusters includes a set of characterizing features which characterize the cluster,
   wherein the received information is grouped with a pre-existing cluster if an inner product of the features that characterize the received information and the features that characterize the pre-existing cluster exceeds a threshold; and
   c) publishing at least a portion of the updated collection of information of the neighborhood of clusters based on a customer request for information.

2. The method of claim 1 wherein the received information comprises a combination of one or more of text data, image data, and video data.

3. The method of claim 1 wherein a number of features of rank of a newly received item of information are compared with a corresponding number of features of a cluster to determine if said information is added to a cluster.

4. The method of claim 3 wherein each feature has a relevancy factor by which the feature is scaled and additionally determining if a cluster and the newly received information have at least a number of common features having non-zero relevancy factors before adding the received information into a cluster.

5. The method of claim 1 wherein the received information is a text containing document and a relevancy of a neighborhood is used to determine whether to publish documents in a neighborhood to a customer.

6. The method of claim 5 wherein the relevancy varies depending on how long the document has been assigned to the neighborhood.

7. The method of claim 5 wherein the relevancy varies with information contained in the request for information.

8. The method of claim 1 wherein an item of received information is grouped into more than one cluster but published with only one neighborhood.

9. The method of claim 8 additionally comprising maintaining a null neighborhood and adding received information to the null neighborhood when said information is initially received.

10. The method of claim 8 additionally comprising maintaining a null neighborhood and adding received information to the null neighborhood when contents of a neighborhood change due to a reconstituting of said neighborhood.

11. The method of claim 8 additionally comprising maintaining a null neighborhood and adding received information to the null neighborhood when a neighborhood to which the received information becomes non-relevant.

12. The method of claim 1 further comprising updating the collection of information by forming a new cluster containing the received information if there are no pre-existing clusters in the collection that have characterizing features in common with the received information.

13. A computer readable storage medium containing instructions for executing a method for dynamically updating a collection of information in a database including a plurality of pre-existing clusters of information for publication, the method comprising:
  a) extracting from received information a set of characterizing features which characterize the received information,
    wherein said received information comprises multiple features of a given type and
    wherein the multiple features are ranked in importance as the features are extracted;
  b) updating the collection of information by grouping the received information with one or more pre-existing clusters in the collection that have characterizing features in common with the received information and grouping together a plurality of pre-existing clusters having common characteristics to produce a neighborhood of clusters,
    wherein each of the one or more pre-existing clusters includes a set of characterizing features which characterize the cluster,
    wherein the received information is grouped with a pre-existing cluster if an inner product of the features that characterize the received information and the features that characterize the pre-existing cluster exceeds a threshold; and
  c) publishing at least a portion of the updated collection of information of the neighborhood of clusters based on a customer request for information.

14. The computer readable storage medium of claim 13 wherein the received information comprises a combination of one or more of text data, image data, and video data.

15. The computer readable storage medium of claim 13 wherein a number of features of rank of a newly received item of information are compared with a corresponding number of features of a cluster to determine if said information is added to a cluster.

16. The computer readable storage medium of claim 15 wherein each feature has a relevancy factor by which the feature is scaled and additionally determining if a cluster and the newly received information have at least a number of common features having non-zero relevancy factors before adding the received information into a cluster.

17. The computer readable storage medium of claim 13 wherein a relevancy of a neighborhood is used to determine whether to publish documents in a neighborhood to a customer.

18. The computer readable storage medium of claim 17 wherein the relevancy varies with how long the document has been in the neighborhood.

19. The computer readable storage medium of claim 17 wherein the relevancy varies with information contained in a request for information.

20. The computer readable storage medium of claim 13 additionally comprising maintaining a null neighborhood and adding received information to the null neighborhood when said information is initially received.

21. The computer readable storage medium of claim 13 additionally comprising maintaining a null neighborhood and adding received information to the null neighborhood when contents of a neighborhood change due to a reconstituting of said neighborhood.

22. The computer readable storage medium of claim 13 additionally comprising maintaining a null neighborhood and adding received information to the null neighborhood when a neighborhood to which the received information becomes non-relevant.

23. The computer readable storage medium of claim 13 further comprising updating the collection of information by forming a new cluster containing the received information if there are no pre-existing clusters in the collection that have characterizing features in common with the received information.

* * * * *